United States Patent [19]

Synstelien et al.

[11] 4,200,249
[45] Apr. 29, 1980

[54] STORAGE DEVICE

[76] Inventors: Floyd L. Synstelien, 323 S. Second St. East, Aurora, Minn. 55705; Howard T. Ysteboe, 80 Pleasant View Ter., New Cumberland, Pa. 17070

[21] Appl. No.: 1,488

[22] Filed: Jan. 8, 1979

[51] Int. Cl.² .................. B65H 49/00; B65H 75/30
[52] U.S. Cl. .................... 242/96; 43/57.5 R; 242/99; 242/137.1
[58] Field of Search ............ 242/99, 96, 129.8, 156.1, 242/137, 137.1, 129.7, 129.71, 129.72, 55.53, 138, 140, 141, 146, 54 R, 71.1; 206/389, 390, 394, 402, 407–409; 43/57.5

[56] References Cited
U.S. PATENT DOCUMENTS

| 673,778 | 5/1901 | Merritt | 242/99 |
|---|---|---|---|
| 1,262,005 | 4/1918 | Bell | 242/96 |
| 2,201,305 | 5/1940 | Springer | 242/84.1 |
| 2,517,866 | 8/1950 | Glahn | 242/137.1 |
| 2,734,306 | 2/1956 | Holdeman | 43/57.5 R |
| 3,008,664 | 11/1961 | McCormick | 242/96 |
| 3,249,320 | 5/1966 | Frederick | 242/156.1 X |
| 3,381,916 | 5/1968 | Edgell | 242/99 X |
| 3,595,497 | 7/1971 | Boatright | 242/99 |
| 3,952,965 | 4/1976 | Falcon | 242/96 |
| 4,036,451 | 7/1977 | Pipkin | 242/137.1 |

Primary Examiner—John M. Jillions
Attorney, Agent, or Firm—Thomas Hooker

[57] ABSTRACT

A two-part storage device for strands includes a case, bobbin and bobbin brake. Storage compartments are provided inside the winding surface of the bobbin and are accessable through an integral door in the case. An H-section hook secures the device to a belt or strap.

13 Claims, 10 Drawing Figures

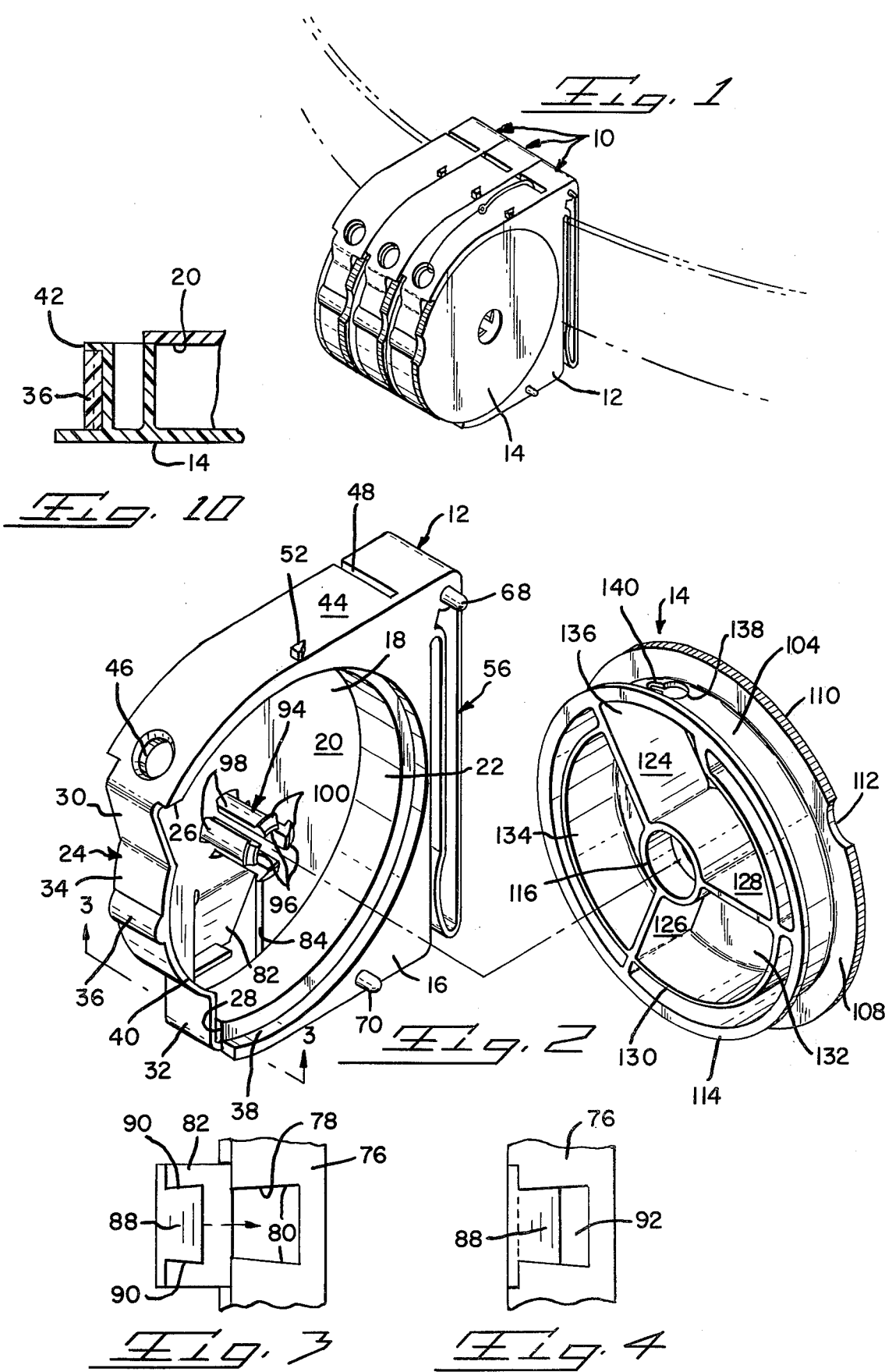

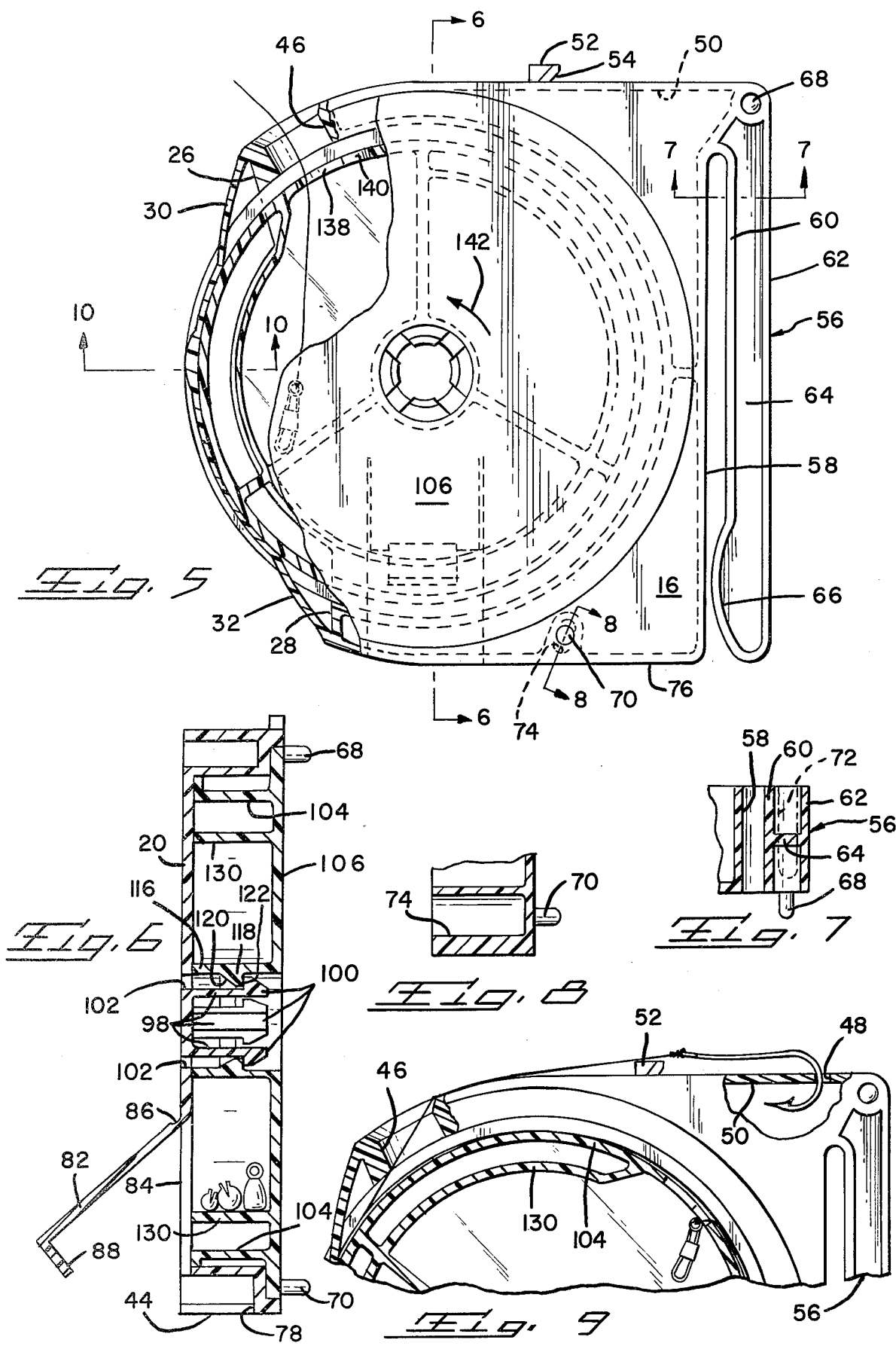

STORAGE DEVICE

The invention relates to an improved storage device for strand material, preferably fishing leaders or the like having hooks on one end and swivels or other attachment means on the other end. The swivel end of the leader is lowered through openings in a case and bobbin and into an interior bobbin compartment. The bobbin is rotated with respect to the case to confine the swivel end of the leader against a slot in the bobbin and wrap lengths of the leader on a bobbin winding surface. The case includes a friction strap, or brake which bears against the winding surface and the leader wound on the surface to hold the leader in place and also prevent accidental rotation of the bobbin and unwinding of the leader. The hook at the other end of the leader may be secured in a slot in the case with the brake holding the leader taut and the hook in place.

An integral H-section hook on the case is used to mount the storage device on a belt or strap. Interference fit pin and slot connections are provided on the cases to enable a number of storage devices to be stacked together to form an assembly for storing a number of leaders. Compartments in the interior of the bobbin may be used for storing small fishing items such as hooks and weights. An integral flexible door with a specialized latch is formed in the back wall of the case to permit access to these compartments.

Reel-type storage devices for fishing leaders and strand material are shown in U.S. Pat. Nos. 2,201,305, 3,008,664, 3,952,965 and 4,036,451. The present invention represents an improvement over the prior devices and provides a two-part molded device for leader or strand storage where the leader or strand is positively confined on the reel by a friction strap. The strap also prevents the reel from rotating from within the case to assure that the leader is held in place without loosening. The friction strap engages the winding surface between the bobbin lips and, in combination with a connection at the reel hub, secures the bobbin to the case.

A strong H-section strap hook enables the storage device to be easily mounted on a support. Interference fit pin and socket connections permit stacking devices together to form an assembly. The connections automatically compensate for molding tolerances while reducing misalignment between the edges of adjacent devices at the top surface where loading and unloading of the leader, hook storage and cutting operations are performed.

Other objects and features of the invention will become apparent as the description proceeds, especially when taken in conjunction with the accompanying drawings illustrating the invention, of which there are two sheets.

IN THE DRAWINGS

FIG. 1 is perspective view of an assembly of improved storage devices stacked together and attached to a belt or strap;

FIG. 2 is an exploded view of a single storage device;

FIG. 3 is a view taken generally in the direction of arrows 3—3 of FIG. 2 showing the door in the open position;

FIG. 4 is similar to FIG. 3 with the door in the closed position;

FIG. 5 is a partially broken away side view of a storage device;

FIGS. 6, 7, and 8 are sectional views taken respectively along lines 6—6, 7—7, and 8—8 of FIG. 5;

FIG. 9 is a partially broken away view of the upper portion of FIG. 5 showing a stored leader; and FIG. 10 is a sectional view taken along line 10—10 of FIG. 5.

Improved storage device 10 includes a case 12 and a bobbin 14 normally attached to the case. Both the case and bobbin are preferably molded from a suitable stiffly flexible plastic material.

The case includes a front wall 16 with a cylindrical bobbin recess 18 extending into the front wall to rear wall 20. The circumference of the recess 18 is defined by a partial cylindrical side wall 22 and a friction brake strap 24 extending between the spaced ends 26 and 28 of side wall 22. The friction strap is free of the case rear wall 20. As illustrated best in FIG. 5, the strap joins the case radially outwardly of wall 22 and includes inwardly angled strap sections 30 and 32 and a semi-cylindrical middle portion 34 joining the ends of the strap sections. An alignment ridge 36 extends across the central outer surface of the strap 34. As illustrated in FIG. 2, case 12 is molded with the inner surface of portion 34 located inside the radius of the cylindrical side wall 22. When the bobbin 14 is attached to case 12 strap 24 is flexed freely outwardly of its molded position. Sections 30 and 32 and portion 34 are resilient springs and bias portion 34 against the bobbin winding surface. A flange groove 38 extends around the wall 22 at its juncture with front wall 16. The edge 40 of friction strap 24 is flush with the bottom of the groove 38. The opposite friction strap edge 42 is spaced a short distance above the surface of rear wall 20. See FIG. 10.

Case 12 includes a side wall 44 extending around wall 22 outwardly of the recess 18. Strap 24 forms a continuation of side wall 44 bridging the ends of wall 22. A beveled loading opening 46 extends through walls 44 and 22 to communicate the outside of the case with the interior of bobbin recess 18. This opening is located adjacent to end 26 as shown in FIG. 5.

Hook retaining slot 48 extends through the thickness of side wall 44 adjacent to the upper corner of the case 12 and leads into an interior core space 50 between walls 22 and 44. Integral leader cutter 52 is provided on the edge of side wall 44 adjacent recess 18 and between opening 46 and slot 48. The cutter 52 includes a sharp leader cutting edge 54 facing the slot 48 and angling away from the surface of wall 44 at an acute angle.

An integral strap hook 56 extends away from the corner of case 12 at slot 48 along portion 58 of side wall 44. The hook 56 includes inner and outer strips 60 and 62 integrally connected by a center web 64 so that the strap hook 56 is generally H-shape in cross section. Strip 60 and 62 parallel wall portion 58. The H-shape cross section provides desired strength for the hook when it is forced over belts or stripping to hold the storage device 10 in place. The hook 56 extends completely along the side wall portion 58 to the adjacent corner where the inner strip 60 is bowed toward the wall portion 58 to reduce the space between the hook and wall and provide a desired detent for holding the hook on a belt or strap as desired. The hook has sufficient resiliency to permit the detent portion 66 to snap over a belt or strap.

A pair of alignment pins 68 and 70 project outwardly of case front wall 16. The case also includes a pair of alignment holes or sockets 72 and 74 located behind the pins 68 and 70. These pins and sockets are used to secure individual storage devices 10 together to form an assembly as shown in FIG. 1 and in that way facilitate ready storage of a number of leaders or like strands. Socket 72 is cylindrical and is dimensioned to form a tight friction fit with the pin 68 of an adjacent storage device. Socket 74 is elongated in the direction of a line extending between holes 72 and 74 with the side walls spaced apart to form a tight friction fit with a pin 70 of an adjacent storage device. The elongation of this socket is required to assure ready stacking of adjacent storage devices 10 despite tolerance accumulations between the two molded cases of the adjacent devices. These tolerances make it impossible to assure that the pins 68 and 70 and sockets of any given case 12 are spaced apart exactly the same distance. By providing the elongated socket 74 having an axis along the line extending between the two pins the devices may be readily secured one to another with a minimum apparent misorientation at the top of the assembly.

Side wall portion 76 of side wall 44 extends from the side wall corner adjacent to the end of hook 56 to the cylindrical wall end 28 and includes a locking recess 78 opening away from front wall 16. The sides 80 of the recess diverge from each other away from the rear wall.

Door 82 is an integral part of case 12 and may be moved between opened and closed positions to open or close access opening 84 formed in the case rear wall 20. The door 82 is connected to the rear wall by a reduced thickness flexible hinge 86 which biases the door toward the open position. The door extends past the edge of rear wall 20 to side wall 44. See FIG. 6. Tapered latch 88 is provided on the free end of door 82 so that when the door is moved down into the plane of the rear wall 20 the tapered latch 88 overlies and may be pushed into the locking recess 78. The side walls 90 of the latch 88 diverge from each other away from the door at the same angle as the tapered sides 80 of the locking recess 78. When the latch is pushed into the recess the door is held in the closed position. Recess 78 is deeper than the latch member 88 to provide a space 92 between the bottom of the recess and the end of the latch. A finger or tool may be inserted into the recess to flex the latch and thereby open the door.

Lock spindle 94 projects from the center of the rear wall 20 outwardly of recess 18 and includes four flexible lock fingers 96. Each finger includes a shaft 98 integral with the rear wall 20 and a latch 100 with a beveled surface facing outwardly of the recess. See FIGS. 2 and 6. The ends of the fingers 96 are below front wall 16. An opening 102 if formed through the rear wall beneath the lock surface of each finger 96 by mold tooling.

The bobbin 14 includes a cylindrical winding surface 104 extending to one side of outer wall 106. Wall 106 projects beyond the winding surface to form an outer lip 108 with a knurled outer edge 110 and an alignment recess 112. An inner retaining lip 114 projects outwardly of the winding surface 104 on the opposite side from lip 108. Lip 114 is lower than lip 108.

A hollow cylindrical central hub 116 extends from wall 106 and includes an interior cylindrical lock ridge 118 having a beveled surface 120 and a lock shoulder 122. Three equally spaced ribs 124, 126 and 128 extend radially outward from the hub 116 to the winding surface 104. As illustrated best in FIG. 2, a partial circumferential wall 130 is located inside the winding surface 104 and extends from rib 124 past ribs 126 and 128 and partway back to rib 124. The end of the wall 130 between ribs 128 and 124 joins the winding surface approximately halfway between the two ribs. The wall 130, hub and adjacent ribs define a pair of storage recesses 132 and 134 in the bobbin. A similar recess 136 is defined by the hub, ribs 124 and 128, winding surface 104 and wall 130. An access opening 138 extends through the winding surface and includes a narrow slot 140 extending circumferentially from the opening. Opening 138 preferably extends across the entire width of winding surface 104.

The case and bobbin of each storage device 10 are assembled by first placing bobbin flange 114 under the lower edge of brake 24, then pushing the bobbin into the bobbin recess 18 of the case so that spindle 94 extends into the bore of hub 116. The bevel surfaces of the individual fingers 96 cam against the bevel surface 120 of the lock ridge 118 to flex the fingers inwardly and permit the latches 100 to move past the ridge and snap back as shown in FIG. 6. In this position the inner surface of the bobbin rests flush upon the case rear wall 20. See FIG. 6. During movement of the bobbin into the case the friction strip 24 is pushed outwardly of its molded position shown in FIG. 2 to permit passage of bobbin lip 114 and the winding surface. With the bobbin in place the strip flexes back toward its original position past lip 114 and is biased against the winding surface 104 to resist rotation of the bobbin with respect to the case. The connection between the strip 24 and lip 114 and the connection at the bobbin hub cooperate to hold the bobbin and case together. The friction strip edges 40 and 42 have close sliding fits with the interior edges of the spindle lips 114 and 108. Lip 114 has a close sliding fit with wall 22 and lip 108 has a close sliding fit with groove 38.

With the bobbin secured to the case the radial extent of the case rear wall 20 projects beyond the bobbin wall 130 to prevent opening of compartments 132 and 134 as the bobbin is rotated with respect to the case. The bobbin may be easily rotated in the case by means of knurled edge 110.

The improved storage device 10 is particularly adapted to be used for storage of fishing leaders of the type having swivels or other mounting means on one end and a hook on the other end. One such leader may be mounted in each of a number of storage devices which may, in turn, be secured together to form a unitary assembly as shown in FIG. 1. To store a leader in the device 10 it is first necessary to rotate the bobbin with respect to the case so that the bobbin orienting recess 112 is opposite the alignment ridge 36 on the case. When in this position, the access opening 138 on the winding surface is located immediately beneath the beveled loading opening 46 in the case. The swivel end of a leader may be dropped through both openings as illustrated in FIG. 5 to position the swivel end in compartment 136. The bobbin is then rotated with respect to the case by means of the knurled lip edge 110 in the direction of the arrow 142 shown in FIG. 5. Initial rotation of the bobbin moves opening 138 past opening 46 and forces the leader into the confining slot 140. Slot 140 is narrower than the swivel or attachment means on the end of the leader in cavity 136 so that the leader is confined in the slot and, with further rotation of the bobbin in the case, the slot pulls a length of the leader through opening 46 and onto the winding illustrated in FIG. 9. The wound leader is kept taut on the winding surface by the friction strip 34. When all the leader has been wound onto the bobbin the hook on the other end may be secured to the case by positioning the hook in slot 48 and then winding the leader taut as shown. In this manner, a leader of a given length may be easily wound on the bobbin and kept in storage until needed without the possibility of being snagged or loosening. When it is desired to remove the leader from the storage device 10 the bobbin is first loosened sufficiently to disengage the hook from slot 48 and then the leader is simply pulled from opening 46. If desired, the leader may be severed after a length is pulled from a bobbin by wrapping it under the sharp edge of cutter 52 and then pulling it back against the edge 54. Another hook may be then secured to the free end of the leader in the storage device and that hook may once more be secured in place in slot 48.

Compartments 132 and 134 provide storage spaces which may be used to retain small items such as sinkers or hooks, for safekeeping until they are needed. Access to these openings is provided by rotating the bobbin in the case so that one of the openings is underneath the door 82 and then opening the door by removing latch 88 from the locking recess 78.

While we have illustrated and described preferred embodiments of our invention, it is understood that these are capable of modification, and we therefore do not wish to be limited to the precise details set forth, but desire to avail ourselves such changes and alterations as fall within the purview of the following claims.

What we claim our invention is:

1. An improved storage device for strand material including a case having a bobbin recess and a bobbin in the recess; the bobbin recess being defined by a rear wall, a generally cylindrical wall joining the rear wall and extending partially around the recess and a friction member between the ends of the generally cylindrical wall, the friction member including a brake located radially inwardly of the generally cylindrical wall and a spring connecting the brake to the case; the bobbin including a generally cylindrical winding surface spaced radially inwardly from the generally cylindrical wall; the bobbin and case including connection means securing the two together while permitting the rotation of the bobbin in the recess; a strand material loading opening extending through the generally cylindrical wall; said spring biasing said brake against the winding surface to limit rotation of the bobbin within the case and to hold wound lengths of strand material in place on the winding surface.

2. An improved storage device as in claim 1 wherein the bobbin includes radially extending lips located on either side of the winding surface, the lip adjacent the case rear wall extending radially outwardly beyond the brake and being cooperable with said member to aid in holding the bobbin within the recess.

3. An improved storage device as in claim 2 wherein the lip away from the rear wall extends radially outwardly beyond the lip adjacent the rear wall and includes a knurled surface to facilitate rotation of the bobbin within the recess.

4. An improved storage device as in claim 1 wherein said case includes first alignment indicia adjacent the recess, the bobbin includes second alignment indicia adjacent the case and an opening extending through the winding surface, the circumferential spacing between the said first alignment indicia and the strand material loading opening and the circumferential spacing between said second alignment indicia and the opening in said winding surface being the same with such openings being located on the same circumferential side from said alignment indicia whereby rotation of the bobbin within the case to position the alignment indicia opposite each other automatically positions the openings opposite each other to permit loading of a strand material through both openings and into the interior of the bobbin.

5. An improved storage device as in claim 4 wherein the opening in the winding surface includes a narrow slot extending along said surface away from the second alignment indicia.

6. An improved storage device as in claim 1 wherein the bobbin includes a central hub, the case includes a lock spindle extending into the hub, connection means on the hub and spindle for permitting rotation of the bobbin with respect to the case while preventing withdrawal of the bobbin from the bobbin recess, a plurality radial ribs extending from the hub to the winding surface, a bobbin front wall covering the side of the bobbin facing outwardly of the bobbin recess, the bobbin front wall, ribs and the case bottom wall defining a number of storage compartments within the bobbin, an access opening in the rear wall, and a door secured to one edge of the access opening by a hinge, and tapered interference fit locking means for holding the door in the closed position.

7. An improved storage device as in claim 6 wherein said tapered interference fit locking means includes a tapered latch member and a tapered recess, the width of the tapered latch means increasing in a direction opposite to the direction of movement of the door from the closed to the opened position.

8. An improved storage device as in claim 7 wherein the case is formed from stiffly flexible plastic material and the hinge is a strip of plastic material having a thickness less than the thickness of the door and the rear wall.

9. An improved storage device as in claim 6 wherein the bobbin includes an inner semi-cylindrical wall spaced radially inwardly from the winding surface and extending at least partially around the circumference of the bobbin.

10. An improved storage device as in claim 1 wherein the case includes a flat side wall and an integral hook extending along the side wall, the hook including inner and outer strips generally parallel to the adjacent side wall and a central web generally perpendicular to the side wall joining said strips so that in transverse cross section the hook is generally H-shaped.

11. An improved storage device as in claim 10 wherein adjacent the free end of the hook the inner strip is bowed toward said surface to form a detent.

12. An improved storage device in claim 1 including a pair of spaced alignment pins projecting outwardly from one side of the case and a pair of alignment sockets formed in the opposite side of the case behind said pins, one of said sockets being elongated in the direction of a line joining said pair of sockets whereby like improved storage devices may be secured together by inserting the pins of one such device into the sockets of the other such device, said elongated socket having sufficient length along said line to assure reception of the pins.

13. An improved storage device as in claim 1 wherein the friction strip extends between the ends of the generally cylindrical wall, the strip including a central brake section resting on the winding surface and a spring connecting each end of the brake section to the adjacent end of the cylindrical wall, said springs biasing the brake section against the winding surface.

* * * * *